United States Patent [19]

Morgan

[11] Patent Number: 5,009,152
[45] Date of Patent: Apr. 23, 1991

[54] REVERSE DIFFUSING BAFFLE FOR APPLYING SPROUT INHIBITOR TO STORED POTATOES

[76] Inventor: Charles R. Morgan, 4659 Enterprise St., Boise, Id. 83705

[21] Appl. No.: 577,488

[22] Filed: Sep. 5, 1990

Related U.S. Application Data

[63] Continuation-in-part of Ser. No. 447,612, Dec. 28, 1989, Pat. No. 4,977,825.

[51] Int. Cl.$^5$ ............................................. A23B 7/00
[52] U.S. Cl. ......................................... 99/476; 99/516
[58] Field of Search ................. 99/467, 468, 473–476, 99/516, 534, 536; 426/312, 321, 419; 55/92, 236, 238; 261/DIG. 46, DIG. 65; 406/47, 48

[56] References Cited

U.S. PATENT DOCUMENTS

| | | | |
|---|---|---|---|
| 3,339,475 | 9/1967 | Martin | 99/476 |
| 4,078,480 | 3/1978 | Luck | 99/516 |
| 4,222,179 | 10/1980 | Sheldon, III et al. | 426/419 |
| 4,421,774 | 12/1983 | Vidal et al. | 426/319 |
| 4,735,134 | 4/1988 | Brouwer | 99/476 |
| 4,887,525 | 12/1989 | Morgan | 99/476 |

Primary Examiner—Timothy F. Simone
Attorney, Agent, or Firm—Frank J. Dykas; Craig M. Korfanta

[57] ABSTRACT

A diffusing baffle assembly (30) for use in diffusing a fog of sprout inhibiter chemical in the discharge of a potato storage ventilation fan centrally positioned in front of the discharge of fan (11) and having a central plenum (31) and with a plurality of elongated channel shaped radial arms (32) attached to central plenum (31) so as to form radially extending channels for the transport of sprout inhibiting chemical from a fogger receiving ring (38) to the ends of radial arms (32). End caps (34) are provided to close off the ends of the chemicals of radial arms (32).

4 Claims, 4 Drawing Sheets

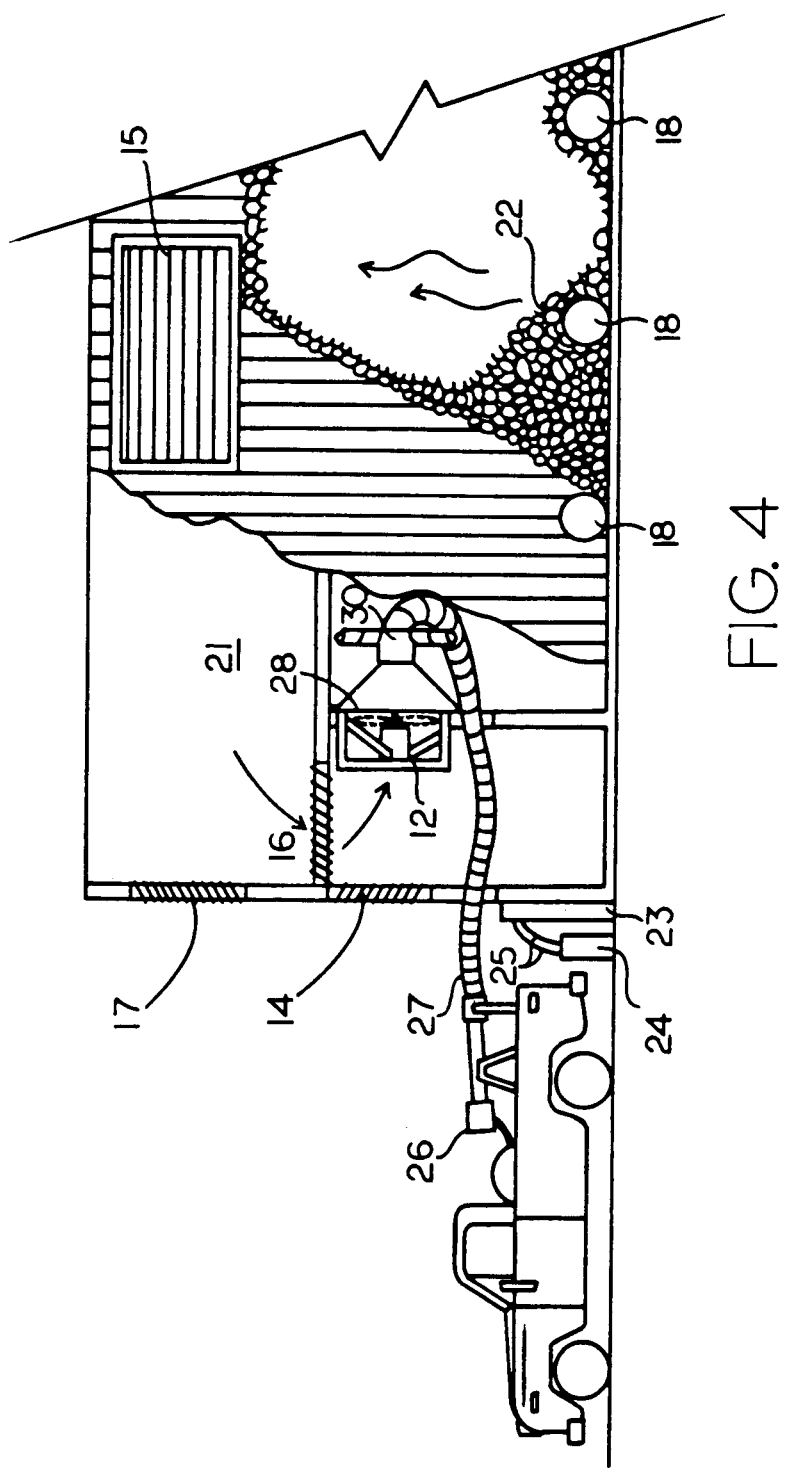

REVERSE DIFFUSING BAFFLE FOR APPLYING SPROUT INHIBITOR TO STORED POTATOES

This is a continuation in part of application Ser. No. 07/447,612, filed Dec. 28, 1989, U.S. Pat. No. 4,977,825.

BACKGROUND OF THE INVENTION

1. Technical Field

This invention relates to a diffusing baffle for applying sprout inhibiting chemicals to stored potatoes, and more particularly to a diffuser which utilizes elongated channel shaped baffles to direct sprout inhibiting chemicals to the inlet of ventilation pipe.

2. Background Art

Potatoes are usually harvested from the ground by the use of digging machines which lift the potatoes from under the ground and convey them up and into the bed of a truck traveling alongside of the harvester. Every attempt is made, both mechanically and by hand sorting, to separate the potatoes from clods of earth and rock. Once a truck is fully loaded, it is taken to a nearby storage where the potatoes are removed from the truck and piled within a storage building.

The potato tuber, when harvested, is a living organism in a nongrowth, or as it is more commonly called, a dormant state. But even in a dormant state it respirates and gives off heat at the rate, depending upon variety, of between 1000 BTU's to 1800 BTU's per ton, per day. The potatoes are piled into earthen floored storage buildings approximately 16' to 20' high, with a typical storage facility holding between 2,500 tons to 12,000 tons in a pile of potatoes which can be as large as 130' wide by 400' long and 20' high. Thus the heat given off by the dormant potatoes in storage is considerable, ranging from 2.5 million to 21.6 million BTU's per day. As a result the problem is not keeping the storage facility heated, but rather cooled on all but the coldest of winter days.

If the potatoes overheat, bacterial activity in the potato pile will rapidly increase causing rot or hot spots in the pile. If the potatoes are chilled below 40° F. the living potatoes will attempt to compensate by converting stored starch to sugar. If the moisture content of the air in the storage exceeds saturation for any given temperature, condensate will drip from the ceiling down into the pile of potatoes further enhancing bacterial activity. If the air is too dry, the potatoes will dehydrate which results in shrinkage of the total tonnage in storage.

The ideal storage parameters for a modern storage facility are 42° F. to 45° F. and 95%, but not saturated, relative humidity. In order to achieve this environment elaborate ventilation systems are incorporated into the storage facility to mix warm inside air with cooler outside air to maintain temperatures within the desired range. Humidification equipment is also provided, but is not relevant to invention at hand.

To get cooling air up through the pile of potatoes, ventilation pipes, having vent holes approximately 1¼ inches to 1⅜ inches in diameter are first laid on the earthen floor before the potatoes are piled into the storage facility. These ventilation pipes are connected to a air supply plenum and are designed to distribute a supply of air to the bottom of the potato pile. This air filters up through the loosely stacked potatoes and exits the top of the pile, thereby keeping the potatoes at the desired temperatures. The air discharged from the pile is then either exhausted to the outside, or returned by means of a return air plenum to the fan where it is usually mixed with cool outside air or, if the outside air is warmer than the inside air, it is directly cycled back into the supply plenum.

These types of storage facilities are well known in the art and are disclosed in LUCK, U.S. Pat. No. 4,078,480 and SHELDON, III, ET AL., U.S. Pat. No. 4,226,179.

It should also be mentioned that refrigerated systems are oftentimes incorporated into the design to cool the inside air if and when the outside air is too warm to serve as an effective source of cooling air. Refrigeration is usually found in storages located in warm climates, or in those storages designed to hold potatoes until later in the season, usually late spring. In any event, the invention described herein works equally well in both ventilation only and refrigeration storages.

Since the potato tuber is alive, albeit in a dormant or nongrowth state, at the time it is placed in the storage, its biological clock is ticking, and sometime before or during the spring it will begin to sprout. Once sprouting commences, the commercial value of the stored crop is substantially decreased. If the potatoes are to be removed from the storage facilities to processing early in the storage season no action to prevent sprouting is necessary. However if storage is planned to extend beyond January then action must be taken to inhibit sprouting. This is done by the use of chemicals.

Sprout inhibiting chemicals such as Isopropyl M-Chlorocarbanilate (CIPC) are typically used to inhibit sprouting. CIPC is an effective sprout inhibitor and is usually applied to the stored potatoes sometime between Oct. and the beginning of Feb. CIPC is a difficult chemical to apply since it is a solid at normal temperatures, and secondly must be applied to potatoes in a storage facility which itself is at a remote location, oftentimes at the end of a unpaved country road. Also, this application must be accomplished during the winter months in inclement weather when it is difficult to keep portable engine powered equipment working properly.

Two different apparatus and processes for applying CIPC are described in LUCK, U.S. Pat. No. 4,078,480 and SHELDON, III, ET AL., U.S. Pat. No. 4,226,179. However there are some general similarities common to all applications of CIPC. First, CIPC must be converted from its solid form to an aerosol capable of being deposited on the skins of the stored potatoes. The most common method is the use of a thermal fogger which heats the CIPC and a solvent solution to produce an aerosol type atomization or fog of CIPC which is then introduced into the air handling system. Such a device is described in the background art of SHELDON, III, ET AL., U.S. Pat. No. 4,226,179 as well as the ultrasonic device of SHELDON. In practice thermal fogging apparatus are the predominant method of atomizing CIPC, and temperatures in the 250° F. range can be maintained by use of propane as a fuel source.

The fog of CIPC is injected into the central air plenum of the storage facility, and is distributed throughout the storage facility by use of the air handling system of the storage facility. The fog of CIPC eventually makes its way down the ventilation pipes, out through the vent holes and filters up through the pile of potatoes, depositing CIPC on the potatoes in the process.

Normal air flow in a ventilated potato storage ranges from 10 to 30 SCFM per ton of potatoes in storage. If, for example, 12,000 tons of potatoes were in a particular storage, this results in an air flow in the central air plenum of up to 360,000 SCFM. That is a lot of air flow, and the result is an extremely fast and turbulent movement of air through the fans and the central air plenum.

Concentrations of CIPC as low as 3 ppm on the surface of a potato are sufficient to inhibit sprouting. The maximum concentration by Federal Regulation is 50 ppm. In practice, using high air flow technologies, sufficient quantities of atomized CIPC must be introduced into the central air plenum to result in average residual concentrations of 17 to 20 ppm on the potatoes if all of it reached the potatoes instead of agglomerating and being deposited on the air handling system surfaces.

The high air flow rates cause a significant problem in that the CIPC is an aerosol suspension with the air inside the storage and is subject to agglomeration and impingement with the surfaces of the air plenum, vent pipes, louvers and fan blades of the air handling system. As the particles of CIPC agglomerate they form droplets sufficiently large to fall out of suspension with the air or which impinge upon the surfaces of the air handling system, forming a coating of CIPC on the air handling equipment which resembles a powdery hoarfrost. This is a significant problem for a number of reasons. First, the CIPC hoarfrost can actually plug ventilation holes in the ventilation pipes; secondly, a significant amount of CIPC, up to 85%, is wasted, and finally, the residue must be cleaned off of the air handling system and that itself is a most unpleasant and time consuming task.

In order to reduce the amount of CIPC used, and the excess residual concentrations of CIPC on the potatoes, I developed an apparatus for reducing the air flow and turbulence within the central air plenum to below 5 SCFM during the introduction of atomized CIPC into the central air plenum, as described in my U.S. patent application Ser. No. 07/281,982, filed Dec. 9, 1988, now U.S. Pat. No. 4,887,525. This apparatus solved two problems, first it eliminated the hoarfrost problem and the exhaust of CIPC to the open atmosphere. This reduced the amount of CIPC injected into the storage, and as a result, reduces the amount of excess CIPC deposited on the potatoes.

In both the high air flow and low air flow technologies the CIPC fog is injected into the storage air supply plenum immediately downstream of the fan discharge. If the fog is injected upstream of the fan much of the chemical is deposited on the fan blades before the chemical fog reaches the potatoes. In practice it has been found that full mixing of CIPC fog with the air in the air supply plenum may not occur until the mixture is 30 to 40 feet downstream of the fan discharge. As a result the air from the air supply plenum being introduced into the ventilation pipes closest to the fan discharge, the upstream ventilation pipes, may not contain sufficient quantities of CIPC to effectively inhibit potato sprouting. Thus, in order to compensate for the lack of CIPC introduction into the upstream ventilation pipes, it is necessary to run the air system long enough to insure that a residual mixture of CIPC and air is completely recycled from the downstream ventilation pipes up through the downstream potatoes, back into the air supply system and from there into the upstream ventilation pipes. This necessarily results in the introduction of greater quantities of CIPC into the air system in order to assure sufficient quantities of an aerosol suspension of CIPC is introduced into the upstream ventilation pipes.

While this extended introduction of CIPC into the storage at reduced air flow rates does increase the concentration of CIPC deposited upon the potatoes piled above the upstream ventilation pipes, the results are not always satisfactory.

Accordingly, what is needed is a method of temporarily baffling the air flow system within the central air plenum, at an upstream location immediately adjacent to the discharge of the air supply fan, in order to insure immediate mixing and that adequate concentrations of CIPC are introduced into the upstream ventilation pipes.

DISCLOSURE OF INVENTION

These objects are accomplished by use of a diffusing baffle which has a cup shaped central plenum receiving baffle having a convex outer surface and a concave inner surface, which is centrally positioned directly downstream from the discharge of the air supply fan. Attached to and extending radially out from the central receiving baffle to the edge of the fan shroud are a plurality of elongated, channel shaped, baffles also having convex outer surfaces and concave inner surfaces through which the fog of CIPC flows from the central receiving baffle, radially outward to the ends of the elongated channel baffles. The diffusing baffle assembly is oriented to position the convex surfaces toward the air flow discharging from the flow. The action of the fan discharge moving around the convex outer surfaces of the radial baffles creates a low pressure area within the concave side of the channel baffles which causes the CIPC fog to flow uniformly toward the low pressure area, thus causing the CIPC fog to spill out of the channels along the length of the baffles resulting in a more uniformed and dispersed introduction of CIPC into the air being discharged from the fan.

BRIEF DESCRIPTION OF THE DRAWINGS

FIG. 4 is a sectional representational view of an air handling system for a potato storage facility with my new reverse diffusing baffle installed.

BEST MODE FOR CARRYING OUT INVENTION

Figure 1:
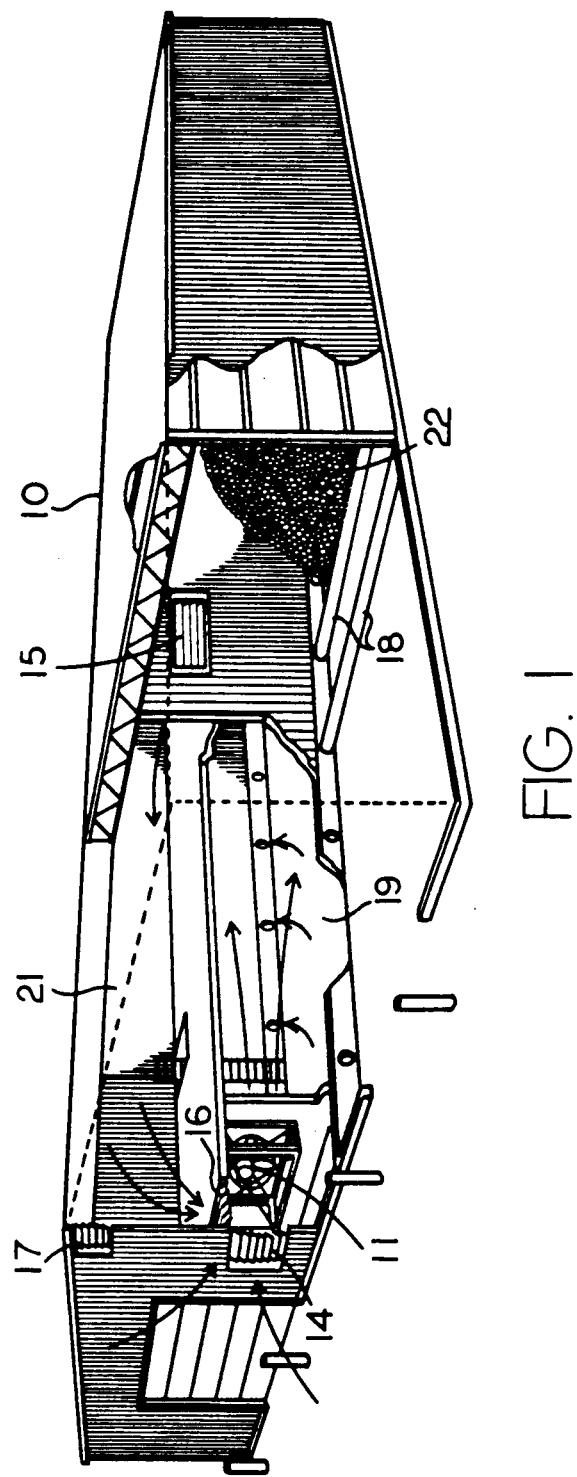
FIG. 1 is a representational view of a typical potato storage facility.
Figure 3:
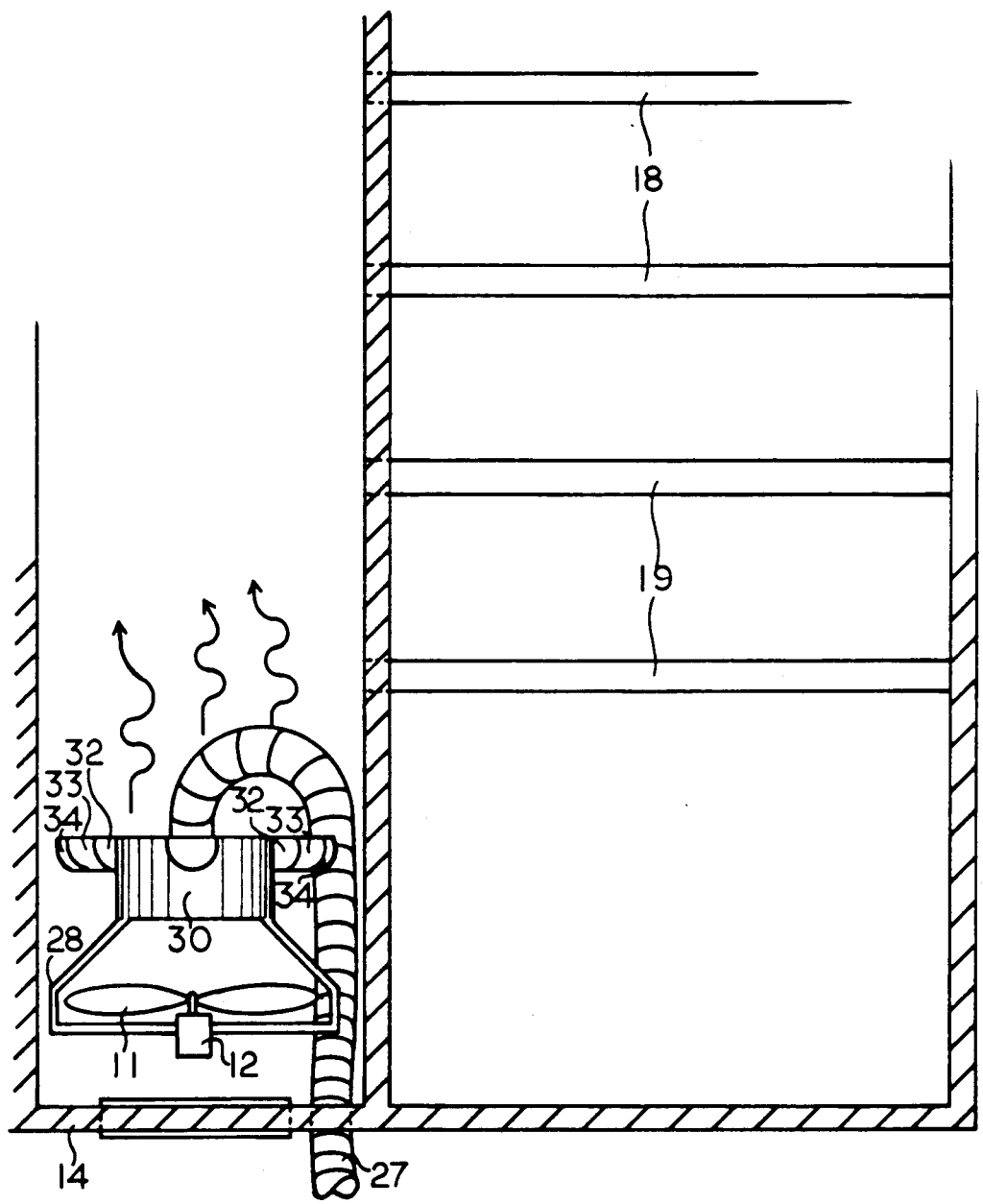
FIG. 3 is a representational top plan view of the air plenum and ventilation pipe assembly for a typical potato storage facility with the diffuser baffle assembly installed.

A typical potato storage facility in use today, as shown in FIGS. 1 and 3, has building 10, central air supply plenum 20 and ventilation pipes 18 and 19 connected to air supply plenum 20 for injecting air into the bottom of the potato pile. Air passes up through vent holes, not shown, in down stream ventilation pipes 18 and upstream ventilation pipes 19 and then filters up through the entire pile of potatoes 22. Air exiting from the top of the potato pile passes through plenum return louvre 15 into return air plenum 21 and is either recycled through mixing louvre 16 through fan 11 and back into air supply plenum 20, or exhausted to the outside atmosphere through exhaust louvre 17.

Temperature in the potato storage is regulated by the introduction of cooler air from the outside atmosphere through outside louvre 14, either as the exclusive source of air or mixed with warmer return air through mixing louvre 16.

Fan 11 is powered by fan motor 12, usually directly driven by connecting the fan 11 directly to the motor shaft. Typically motors 12 are three-phase 240 or 460 volt synchronous motors, supplied through electrical control box 23.

As can be seen in FIG. 4, a frequency generator 24, utilizing jumper cables 25 is temporarily installed between the 60 cycle standard power supply control box 23 and fan motor 12. Frequency generator 24 is then operated to reduce the frequency being supplied to fan motor 12 from 60 Hz to 15 to 25 Hz, depending upon the design of the particular air handling system. In this manner, air flow in the central air plenum is reduced from between 10 and 30 SCFM per ton of potatoes to less than 5 SCFM per ton of potatoes.

Figure 2:
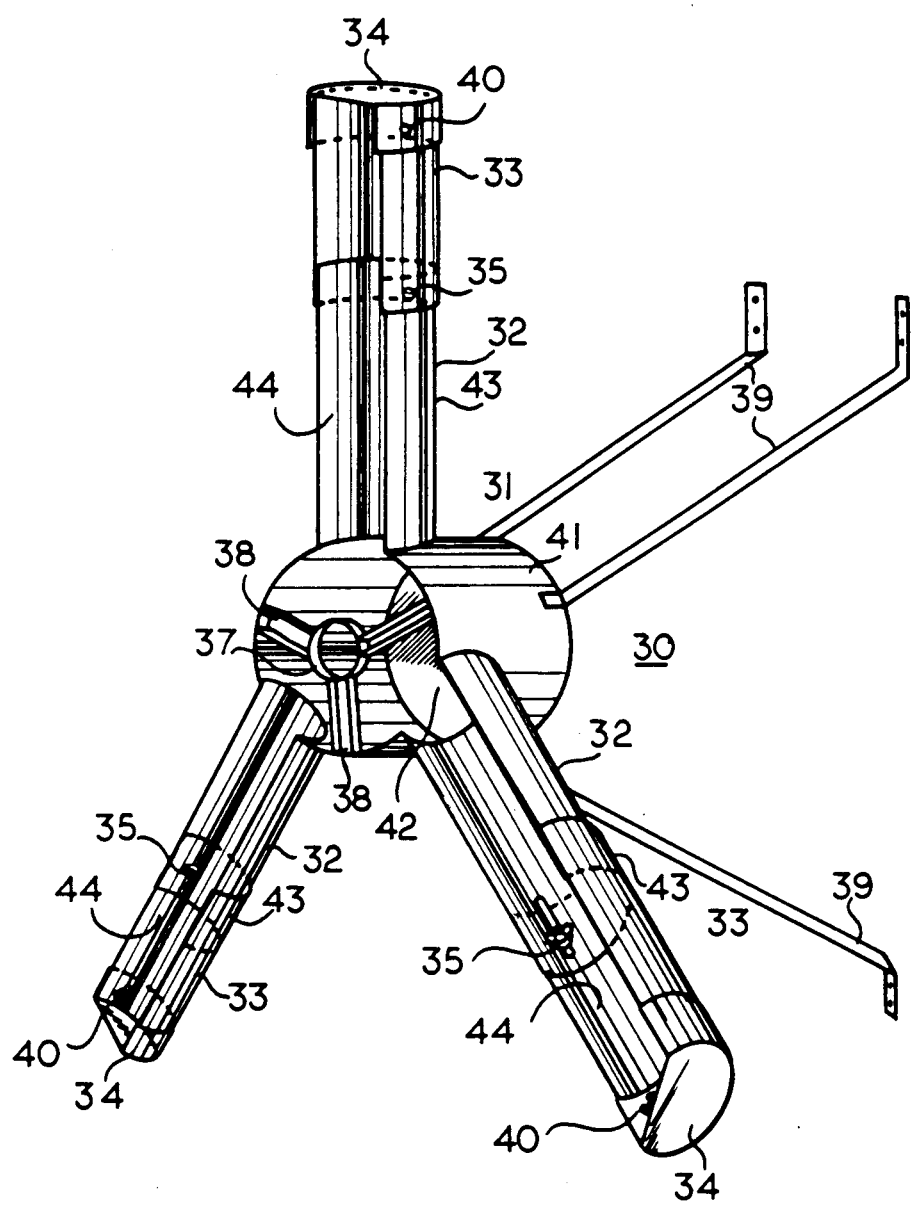
FIG. 2 is a perspective representational view of the reverse diffusing baffle.

Once the air flow has been reduced thermal fogger 26 is used to create an aerosol fog of CIPC which is then introduced into the central plenum receiving baffle 31 of diffusing baffle assembly 30 as shown in FIGS. 2 and 4. To accomplish this, the end of thermal fogger pipe 27 is inserted into and held by fogger pipe receiving ring 37. Central plenum receiving baffle 31 is cup shaped with a convex outer surface 41 and a concave inner surface 42, and has passages through the side walls thereof to which are attached elongated radial channel arms 32 which also have convex outer surfaces 43 and concave inner surfaces 44.

The air suspension of CIPC, when introduced into central plenum receiving baffle 31, is then drawn by the slight low pressure caused by the movement of the air discharged by the fan around the convex outer surface of the radial channel baffles, out radially into radial arms 32. A plurality of radial channel arm extensions 33 having convex outer surfaces 43 and concave inner surfaces 44 are provided and attachable to radial channel arms 32 by means of wing nut assemblies 35 and passing through elongated channel arm extension slots 36 in order to form the necessary length of channel to extend the arms out to cover the entire width or diameter of fan 11.

In practice it has been found that providing end caps 34 for radial arm extensions 33, results in better introduction and distribution of the air suspension of CIPC into the air plenum air flow in that the concentrated air suspension of CIPC collects in the radial arm extension assemblies. When enough CIPC fog is present in radial arm extension assemblies to equalize the pressure, the CIPC fog spills out along the length of the radial arms 32 and the extensions 33 as opposed to pouring out the end of the channel formed therein. End caps 34 are attached to the end of radial arm extensions 33 by means of wing nut assemblies 40.

Entire diffuser assembly 30 is attachable to the fan shroud as shown in FIG. 3 for fan 11 and is thus positionable centrally in front of the discharge of fan 11.

In operation, this results in an immediate dispersion of the CIPC fog directly downstream from the fan discharge, thus facilitating the injection of the suspension of air and CIPC into upstream ventilation pipes 19.

While there is shown and described the present preferred embodiment of the invention, it is to be distinctly understood that this invention is not limited thereto but may be variously embodied to practice within the scope of the following claims.

I claim:

1. A diffusing baffle for use in applying sprout inhibiting chemicals to potatoes stored in a potato storage facility having an air supply plenum, a fan for discharging air into the air supply plenum, and a plurality of ventilation pipes open to the air supply plenum for delivering air to the stored potatoes, which comprises:
   a central plenum receiving baffle having a convex outer surface and a concave inner surface;
   means for introducing a sprout inhibiting chemical into said central plenum receiving baffle;
   a plurality of elongated channel shaped radial arms having convex outer surfaces and concave inner surfaces attached to and extending radially out from said central plenum receiving baffle so as to form radially extending channels for the transport of sprout inhibiting chemical from the introduction means to the ends of said arms; and
   means for centrally positioning the central plenum receiving baffle and the radial arms in front of the discharge of the fan with the convex outer surfaces facing the fan.

2. The diffusing baffle of claim 1 wherein said elongated radial arms are adjustable in length.

3. The diffusing baffle of claim 1 wherein said diffusing baffle further includes end cap means for closing off the ends of the channels of the elongated radial arms.

4. A diffusing baffle for use in applying sprout inhibiting chemicals to potatoes stored in a potato storage facility having an air supply plenum, a fan for discharging air into the air supply plenum and a plurality of ventilation pipes open to the air supply plenum for delivering air to the stored potatoes, which comprises:
   a central plenum receiving baffle having a convex outer surface and a concave inner surface;
   means for introducing a sprout inhibiting chemical into said central plenum receiving baffle;
   a plurality of elongated channel shaped radial arms having convex outer surfaces and concave inner surfaces attached to and extending radially out from said central plenum receiving baffle so as to form radially extending channels for the transport of sprout inhibiting chemical from the introduction means to the ends of said arms, said arms being adjustable in length;
   means for centrally positioning said central plenum receiving baffle and radial arms in parallel spaced relationship with and in front of the discharge of the fan with the convex outer surfaces facing the fan; and
   end cap means for closing off the radial ends of the channels of the elongated radial arms.

* * * * *